United States Patent [19]
Moulton

[11] Patent Number: 6,109,634
[45] Date of Patent: Aug. 29, 2000

[54] BICYCLE AND A FRONT WHEEL SUSPENSION SYSTEM THEREFOR

[75] Inventor: Alexander Eric Moulton, Bradford on Avon, United Kingdom

[73] Assignee: Moulton Developments Limited, Bradford on Avon, United Kingdom

[21] Appl. No.: 09/257,005

[22] Filed: Feb. 25, 1999

[30] Foreign Application Priority Data

Feb. 26, 1998 [GB] United Kingdom .................... 9804133
May 12, 1998 [GB] United Kingdom ...................... 981008

[51] Int. Cl.⁷ ..................................................... B62K 21/14
[52] U.S. Cl. ............................................................ 280/276
[58] Field of Search ................................... 280/275, 276, 280/277, 279

[56] References Cited

U.S. PATENT DOCUMENTS

| | | | |
|---|---|---|---|
| 5,441,291 | 8/1995 | Girvin III ................................ | 280/276 |
| 5,599,034 | 2/1997 | Brigden .................................. | 280/276 |
| 5,660,406 | 8/1997 | sen. ......................................... | 280/276 |
| 5,749,590 | 5/1998 | Roerig ..................................... | 280/276 |
| 5,921,145 | 7/1999 | Muser .................................... | 74/551.2 |

*Primary Examiner*—Kevin Hurley
*Attorney, Agent, or Firm*—Dennison, Scheiner, Schultz & Wakeman

[57] ABSTRACT

A two wheeled bicycle; and a suspension system for the front wheel thereof are described comprising a steering column surmounted by a handlebar and supported in known manner for rotation within a head tube of a frame of the bicycle and a fork structure which at its lower end mounts the spindle of the front wheel. The fork structure is extended upwardly, and is spaced in front of, and in parallel with the steering column, and the system includes means which constrain said fork structure so that, in the steering mode, it rotates as a body about the rotational axis of the steering column. To this end, an upper region of the fork structure is pivotally connected to the steering column at a region thereof which protrudes upwardly from the head tube, the said pivotal connection including firstly, a pair of links, one to each side of the bicycle, and secondly, at least one bonded rubber/metal torsional shear spring having at least one cylindrical rubber bush which is elastically wound in shear when the wheel rises relative to the steering column. Furthermore, the fork structure, at a region thereof which is just above the level of the top of the wheel, is pivotally connected to the steering column at a region thereof which protrudes downwardly from the frame tube, said pivotal connection including firstly a pair of links, one to each side of the bicycle, and secondly, at least one bonded rubber/metal torsional shear spring having a cylindrical rubber bush which is elastically wound in shear when the wheel rises relative to the steering column. Preferably, the system whereby the steering column is pivotally connected to the fork structure comprises four said shear springs each comprising rubber bush assemblies, the rubber bushes of which are wound all in parallel as the front wheel rises relative to the steering column. And preferably also, each rubber bush comprises a cylindrical body of rubber bonded between inner and outer metal sleeves, with the rubber being wound elastically in torsional shear when the metal sleeves are rotated, one relative to the other.

3 Claims, 4 Drawing Sheets

BICYCLE AND A FRONT WHEEL SUSPENSION SYSTEM THEREFOR

Moulton bicycles since their introduction in 1962 all have "full suspension" ie for both wheels. Such wheels have had an overall diameter typically of 16 or 18 inches, and rarely exceeding say 20 inches.

The later introduction of the so-called mountain-bikes for off-road use has highlighted the need for suspension for bicycles which now proliferate. The most common type of front suspension used is the twin telescopic or sliding forks, conceptually derived from the standard motor cycle practice, which in turn replaced the girder type used on motor cycles from the beginning of the century to the 1950's. While the telescopic fork is neat in appearance, its sliding, working surfaces are enclosed and hydraulic damping can also be contained in the legs; its disadvantage for bicycle use is the need for stiffening elements joining the moving legs especially due to the lack of stiffness of typical bicycle hub spindles, in contrast to those on motorcycles. The basic telescopic fork suspension also has an inherent diving tendency during braking due to instantaneous centers of rotation being low to the rear. Typical telescopic forks for bicycles involve a significant weight addition.

Broadly stated the present invention provides a suspension system for the front wheel of a cycle in which movement of the wheel, both upwardly and downwardly relative to a steering column of the cycle, is supported by multiple bush means, each comprising at least one rubber sleeve which is elastically wound in torsional shear when the wheel moves upwardly relative to the steering column.

In one preferred form, the suspension for the front wheel of a cycle, comprises a steering column which is surmounted by a handlebar and supported in known manner for rotation within a head tube of a frame of the cycle; and the suspension further includes a fork structure which at its lower end mounts the spindle of the front wheel, and wherein the fork structure is extended upwardly, ahead of and in parallel with the steering column, with an upper region of the fork structure being pivotally connected to the steering column at a region thereof which protrudes upwardly from the head tube, the said pivotal connection including at least one bonded rubber/metal torsional shear spring having a rubber sleeve which is elastically wound in shear when the wheel rises relative to the steering column.

Preferably the steering column also projects downwardly from the head tube and an intermediate region of the said fork structure is pivotally connected to such downwardly protruding part of the steering column, the said second pivotal connection also including at least one bonded rubber/metal torsional shear spring having a rubber sleeve which is elastically wound in shear when the wheel rises relative to the steering column.

The pivotal connections are leading links which constitute means constraining said fork stricture so that, in the steering mode, it rotates as a body about the rotational axis of the steering column. And the links and the rubber bushes allow the fork to rise and fall in front of the steering column as the front wheel rises and falls on encountering inequalities in the road surface.

The bicycle front suspension system provided according to this invention will now be further described by way of example, with reference to the accompanying drawings in which:

FIG. 1 is a side elevational view, while

Figure 1:
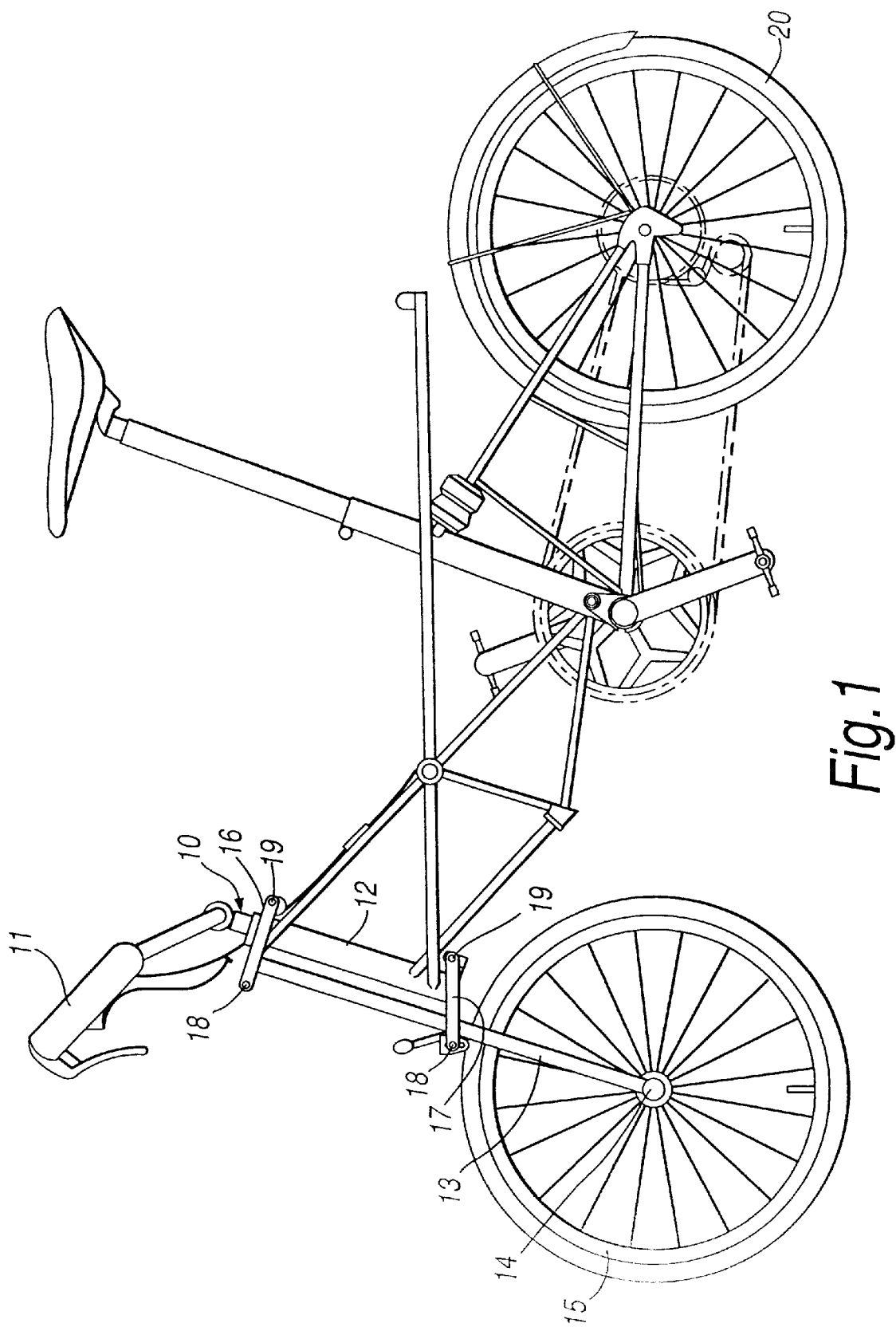

In the embodiment shown, the suspension for the front wheel of a cycle, comprises a steering column 10 which is surmounted by a handlebar 11 and supported in known manner by upper and lower ball bearing assemblies 8 and 9 for rotation within a head tube 12 which forms a structural part of the frame of the cycle; and the suspension further includes a fork structure 13 which at its lower end mounts the spindle 14 of the front wheel 15.

The fork structure 13 is formed by twin legs girded together and is extended upwardly, ahead of and in parallel with the steering column 10 which is rotatable within the head tube 12.

An upper region of the fork structure 13 is pivotally to the steering column at a region thereof which protrudes upwardly from the head tube 12, the said pivotal connection including at least one bonded rubber/metal torsional shear spring having a rubber sleeve which is elastically wound in torsional shear when the fork structure 13 carrying the wheel rises relative to the steering column 10.

The steering column 10 also projects downwardly from the head tube 12 and an intermediate region of the said fork structure 13 is pivotally connected to such downwardly protruding part of the steering column, the said second, lower pivotal connection also including at least one bonded rubber/metal torsional shear spring having a rubber sleeve which is elastically wound in torsional shear when the wheel rises relative to the steering column.

The said upper and lower pivotal connections are by an upper pair 16 and lower pair 17 of leading links which constitute means constraining said fork structure 13 so that, in the steering mode, it rotates as a body about the rotational axis of the steering column 10. And the links and the rubber bushes allow the fork structure 13 to rise and fall in front of the steering column 10 as the front wheel 15 rises and falls on encountering inequalities in the road surface, Each of the upper and lower links 16, 17 extend between front and rear transversely disposed front and rear rubber torsion bushes 18, 19. The front bushes 18 are disposed ahead of the fork structure 13 while the rear bushes 19 are disposed in rear of the steering column 10. The vertical span between the front bushes 18 is greater than the corresponding span between the rear bushes 19, so that if the lines of the links 16 and 17 is extended rearwardly the lines will nationally intersect at a point above the spindle of the rear wheel 20 of the machine.

Figure 2:
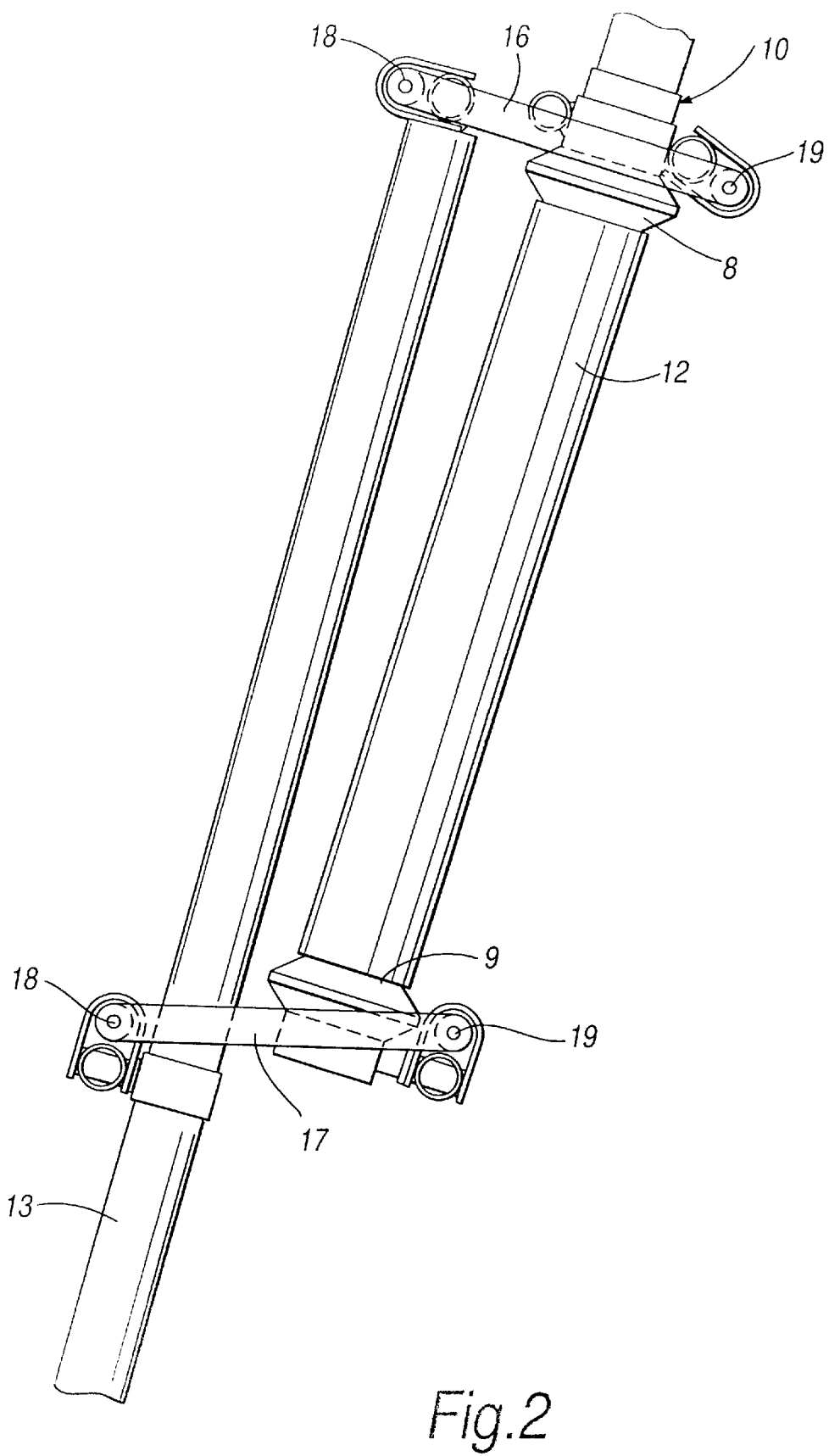
FIG. 2 is a similar view to larger scale.

Preferably, and as shown in FIG. 2, each respective upper or lower leading link assemblies 16, 17 includes the twin rubber torsion bushes working in series with the inner shafts of the front and rear bushes in each linkage being united into a quadrilateral bracelet.

Figure 3:
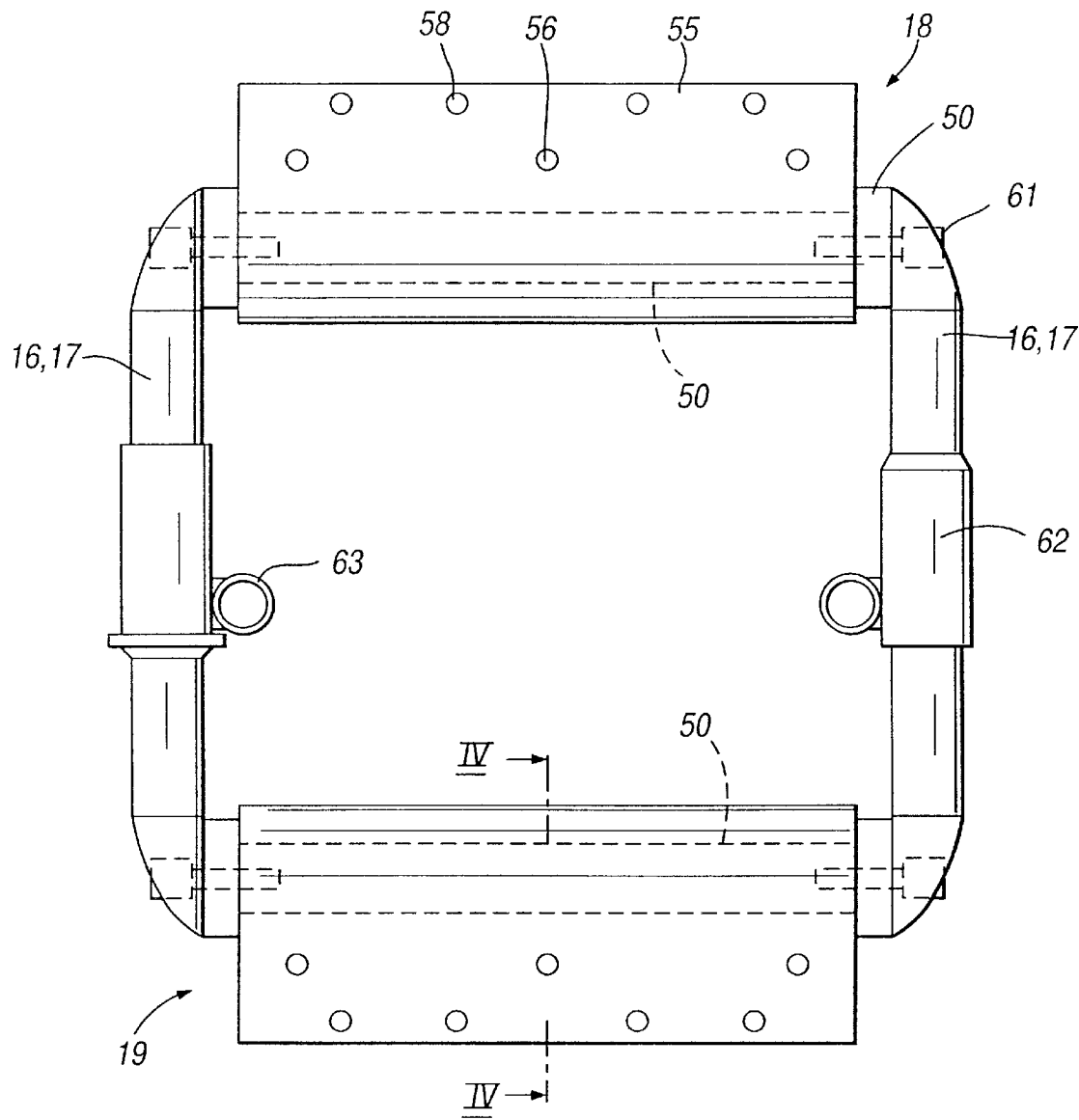
FIG. 3 is a plan view of one example of a twin leading link assembly incorporating two torsional shear springs.
Figure 4:
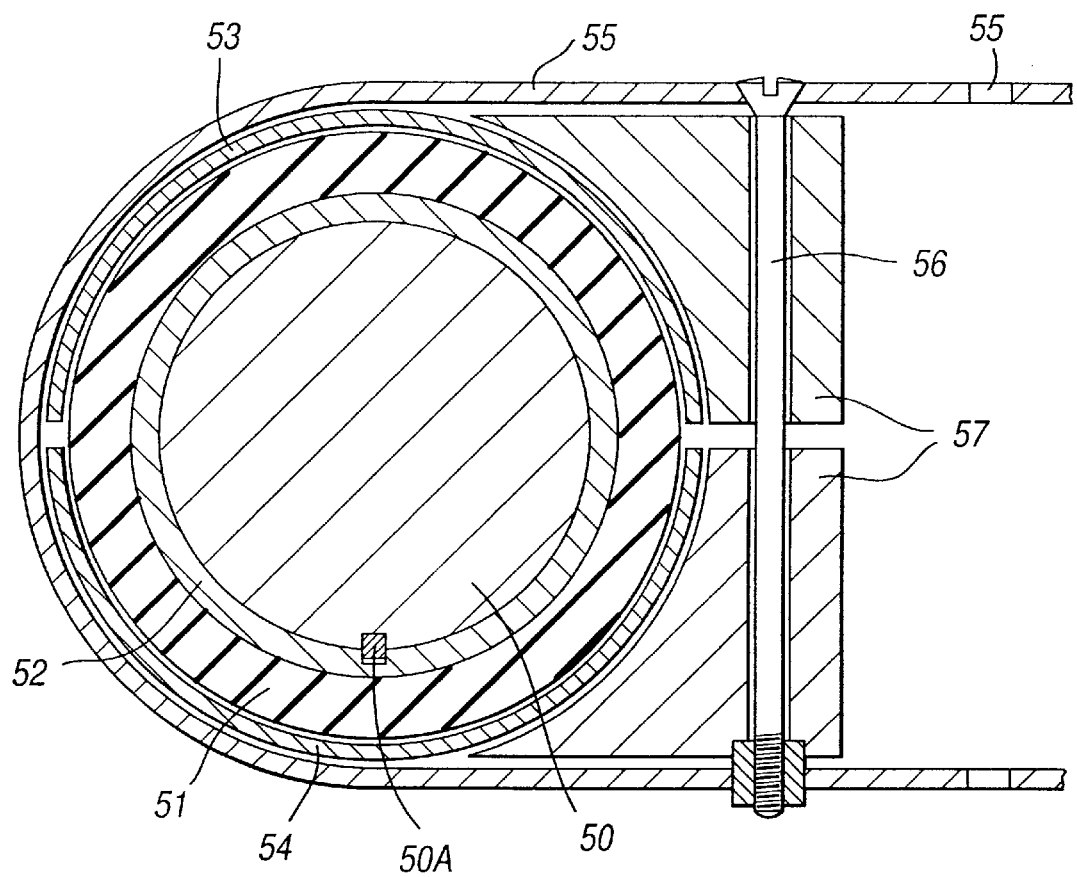
FIG. 4 is an enlarged detail view taken in cross-section on the line III—III of FIG. 2.

As will be seen from FIG. 3 where a single bush is shown in greater detail, each bush comprises a cylindrical body of rubber 51 bonded between an inner matal cylindrical 52 and a pair of outer half-shells 53 and 54 also of metal. Initially the half-shells 53 and 54 are separated by a gap; but this gap can be closed to precompress the rubber body 51 by means of a closure band 55 which embraces the outer half-shells and which can be made to clamp them and exert pressure to close thems onto the rubber within by tightening a nut and bolt fastening assembly 56, with over tightening being prevented by spacer blocks 57. The closure band 55 is generally U-shaped and has bolt holes 58 whereby it can be secured to the steering column 10 or the fork structure 13 as the case may be.

The links comprising the upper and lower leading link assemblies 16 and 17 are connected to, or integral with a shaft 50 which passes through the inner shell 52 and be secured against relative rotation for example by a key 50A, or a spline may be used to prevent relative turning. The links 16 and 17 will interconnect the two shafts 50 of the front and rear bushes 18 and 19.

The outers shells 53 and 54 of the bushes are held against rotation relative to the closing members 55 when the fastenings 56 are tightened; and these members 55 secure the front and rear bushes 18 and 19 shown in FIG. 2, one 19 to the steering column 10 and the other 18 to the twin legs of the fork structure 13, these tubular legs holding the wheel spindle at their base.

The torque reaction from the shells 53, 54 are thus taken by equal bending moments via the closure members 55—one into the steering column 10, and the other into the fork leg structure 13. In the configuration shown in FIG. 3, there are in effect two similar rubber bushed, leading link bracelets, one 16 fixed between the top of the steering column 10 and the top of the fork tube structure 13; while the other 17 is fixed between the base of the steering column 10 and an intermediate part of the fork tube structure 13 just above the front wheel 15.

The steering column 10 has the conventional bearings or head races 8 and 9 at the top and bottom, which take the sprung wheel loads into the frame in the usual way through the head tube 12.

The steering or guidance function is performed through these two rubber bushes leading link bracelets 16 and 17, in some ways like a 'girder fork' sometimes found on motorcycles, but with the essential difference that the linkage requires no lubrication at the bearings nor is backlash developped. Moreover the parasitic stiffness of these rubber bushes are extremely high, for instance exceeding 6000 lb/in radially in the small size appropriate for a bicycle suspension. Thus the integrity of the guidance function is well achieved, namely the keeping of the fork structure 13 and the steering column 10 in the required paralel relationship to give maintenance of the wheel in its intended plane under all side loading conditions.

The range of variation in rider weight on a bicycle is large and the style of riding preferred can widely differ. In order to enjoy the benefit of suspension at all times, it is preferable to have means for adjustment to cater for these variants. The preferred choice for this new concept is to have the main front wheel ride rate from the rubber bushes low at say 50–60 lb/in. This low rate is progressively increased by an auxiliary elastomer spring, in which the point of engagement in the wheel stroke can be adjusted. A convenient location for this auxiliary spring (not shown) is at the bottom of the steering column and at this location a forwardly projecting bracket may be provided. This bracket attached to the steering column extends between the twin fork legs of the structure 13 and will mount a manually adjustable rubber abutment or snubber which engages a crown bridging the fork legs. This abutment can be screwed in or out from the bracket to raise or lower the snubber which is a soft rubber cushion abutting the crown. The arrangement is such that the additional resistance given by the auxiliary rubber spring is adjustable by the rider to suit his needs.

Rebound control may be achieved by a cable or stirrup attached at its lower end to the structure 13 and extending upwards. Its upper end will be selectively engagable with the bracket which is fast with the steering column. This reaction point may comprises a hand operated screw adjuster to alter the active length thus restricting the downward or rebound movement of the suspension according to taste. This screw adjuster may be the same element which is used to adjust the height of the above mentioned auxiliary rubber spring. A quick acting lever release can also be fitted.

The links 16 and 17 are prefearably designed so that they can be readily be disconnected from the rear bushes 19, preferably by removal of a single bolt 61 at each bush. In this way the front wheel together with the fork structure 13, as a unit, may be readily separated from the remainder of the machine.

In another arrangement and as shown in FIG. 3, each link may be separable into two parts front and rear connected together by a telescopic sleeve 62 each fitted with a clamping bolt 63.

The links 16 and 17 are preferably connected to the associated rubber torsion bushes 51 front and rear in such manner as to allow angular adjustment of the links relative to the bushes, such adjustment being followed by secure clamping once a desired set up and ride height has been obtained.

What is claimed is:

1. A two wheeled bicycle; and a suspension system for the front wheel thereof, comprising a steering column surmounted by a handlebar and supported in known manner for rotation within a head tube of a frame of the bicycle and a fork stricture which at its lower end mounts the spindle of the front wheel;

and wherein the fork structure is extended upwardly, spaced in front of, and in parallel with the steering column, and including means which constrain said fork structure so that, in the steering mode, it rotates as a body about the rotational axis of the steering column;

and wherein an upper region of the fork structure being pivotally connected to the steering column at a region thereof which protrudes upwardly from the head tube, the said pivotal connection including firstly, a pair of links, one to each side of the bicycle, and secondly, at least one bonded rubber/metal torsional shear spring having at least one cylindrical rubber bush which is elastically wound in shear when the wheel rises relative to the steering column;

and wherein the fork structure, at a region thereof which is just above the level of the top of the wheel, is pivotally connected to the steering column at a region thereof which protrudes downwardly from the frame tube, said pivotal connection including firstly a pair of links, one to each side of the bicycle, and secondly, at least one bonded rubber/metal torsional shear spring having a cylindrical rubber bush which is elastically wound in shear when the wheel rises relative to the steering column.

2. A bicycle and a suspension system therefor according to claim 1, and wherein the system whereby the steering column is pivotally connected to the fork structure comprises four said shear springs each comprising rubber bush assemblies, the rubber bushes of which are wound all in parallel as the front wheel rises relative to the steering column.

3. A bicycle and a suspension system therefor according to claim 2, and wherein each rubber bush comprises a cylindrical body of rubber bonded between inner and outer metal sleeves, with the rubber being wound elastically in torsional shear when the metal sleeves are rotated, one relative to the other.

* * * * *